US004001607B2

United States Statutory Invention Registration [19]

[11] Reg. Number: H1607

[45] Published: Nov. 5, 1996

Yang et al.

[54] MULTIACTIVE ELECTROPHOTOGRAPHIC ELEMENT

[75] Inventors: Hsinjin Yang, Fairport; Paul D. Yacobucci; David S. Weiss, both of Rochester, all of N.Y.

[73] Assignee: Eastman Kodak Company, Rochester, N.Y.

[21] Appl. No.: 748,366

[22] Filed: Aug. 22, 1991

[51] Int. Cl.[6] ..... G03G 15/02

[52] U.S. Cl. ..... 430/59

[58] Field of Search ..... 430/96, 58, 59, 430/83

[56] References Cited

U.S. PATENT DOCUMENTS

| | | | |
|---|---|---|---|
| 3,041,166 | 6/1962 | Bardeen . | |
| 3,165,405 | 1/1965 | Hoesterey . | |
| 3,394,001 | 7/1968 | Makino . | |
| 3,679,405 | 7/1972 | Makino et al. . | |
| 3,725,058 | 4/1973 | Hayashi et al. . | |
| 4,175,960 | 11/1979 | Berwick et al. . | |
| 4,284,699 | 8/1981 | Berwick et al. . | |
| 4,539,282 | 9/1985 | Morimoto et al. | 430/59 |
| 4,578,334 | 3/1986 | Borsenberger et al. . | |
| 4,666,802 | 5/1987 | Hung et al. . | |
| 4,701,396 | 10/1987 | Hung et al. . | |
| 4,719,163 | 1/1988 | Staudenmayer et al. . | |
| 4,840,860 | 6/1989 | Staudenmayer et al. | 430/59 |
| 4,840,861 | 6/1989 | Staudenmayer et al. | 430/59 |
| 4,933,245 | 6/1990 | Akasaki et al. | 430/59 |
| 5,112,935 | 5/1992 | Yacobucci et al. | 548/176 |
| 5,130,215 | 7/1992 | Adley et al. | 430/58 |

FOREIGN PATENT DOCUMENTS

| | | |
|---|---|---|
| 62-247374 | 10/1987 | Japan . |
| 63-04164 | 2/1988 | Japan . |
| 63-04165 | 2/1988 | Japan . |

*Primary Examiner*—Charles T. Jordan
*Assistant Examiner*—John R. Hardee
*Attorney, Agent, or Firm*—David F. Janci

[57] ABSTRACT

An improved reusable multiactive electrophotographic element has a charge-transport layer comprising a triarylamine charge-transport material in a binder comprising a polyester containing recurring units having the structure

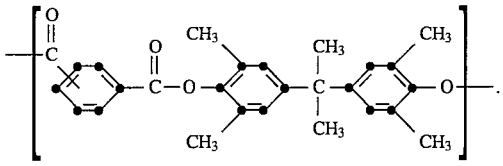

3 Claims, No Drawings

MULTIACTIVE ELECTROPHOTOGRAPHIC ELEMENT

FIELD OF THE INVENTION

This invention relates to multiactive electrophotographic elements, i.e., elements containing a charge-generation layer and a charge-transport layer. More particularly, the invention relates to such elements which are reusable and contain a triarylamine charge-transport material in the charge-transport layer.

BACKGROUND

In electrophotography an image comprising a pattern of electrostatic potential (also referred to as an electrostatic latent image), is formed on a surface of an electrophotographic element comprising at least an insulative photoconductive layer and an electrically conductive substrate. The electrostatic latent image is usually formed by imagewise radiation-induced discharge of a uniform potential previously formed on the surface. Typically, the electrostatic latent image is then developed into a toner image by bringing an electrographic developer into contact with the latent image. If desired, the latent image can be transferred to another surface before development.

In latent image formation the imagewise discharge is brought about by the radiation-induced creation of electron/hole pairs, which are generated by a material (often referred to as a charge-generation material) in the electrophotographic element in response to exposure to the imagewise actinic radiation. Depending upon the polarity of the initially uniform electrostatic potential and the types of materials included in the electrophotographic element, either the holes or the electrons that have been generated, migrate toward the charged surface of the element in the exposed areas and thereby cause the imagewise discharge of the initial potential. What remains is a non-uniform potential constituting the electrostatic latent image.

Such elements may contain material which facilitates the migration of generated charge toward the oppositely charged surface in imagewise exposed areas in order to cause imagewise discharge. Such material is often referred to as a charge-transport material.

One type of well-known charge-transport material comprises a triarylamine. The term, "triarylamine," as used herein is intended to mean any chemical compound containing at least one nitrogen atom that is bonded by at least three single bonds directly to aromatic rings or ring systems. The aromatic rings or ring systems can be unsubstituted or can be further bonded to any number and any types of substituents. Such triarylamines are well known in the art of electrophotography to be very capable of accepting and transporting charges generated by a charge-generation material.

Among the various known types of electrophotographic elements are those generally referred to as multiactive elements (also sometimes called multilayer or multi-active-layer elements). Multiactive elements are so named, because they contain at least two active layers, at least one of which is capable of generating charge in response to exposure to actinic radiation and is referred to as a charge-generation layer (hereinafter sometimes alternatively referred to as a CGL), and at least one of which is capable of accepting and transporting charges generated by the charge-generation layer and is referred to as a charge-transport layer (hereinafter sometimes alternatively referred to as a CTL). Such elements typically comprise at least an electrically conductive layer, a CGL, and a CTL. Either the CGL or the CTL is in electrical contact with both the electrically conductive layer and the remaining CGL or CTL. The CGL comprises at least a charge-generation material; the CTL comprises at least a charge-transport material; and either or both layers may additionally comprise a film-forming polymeric binder.

Among the known multiactive electrophotographic elements, are those which are particularly designed to be reusable and to be sensitive to imagewise exposing radiation falling within the visible and/or infrared regions of the electromagnetic spectrum. Reusable elements are those that can be practically utilized through a plurality (preferably a large number) of cycles of uniform charging, imagewise exposing, optional development and/or transfer of electrostatic latent image or toner image, and erasure of remaining charge, without unacceptable changes in their performance. Visible and/or infrared radiation-sensitive elements are those that contain a charge-generation material which generates charge in response to exposure to visible and/or infrared radiation. Many such elements are well known in the art.

For example, some reusable multiactive electrophotographic elements which are designed to be sensitive to visible radiation are described in U.S. Pat. Nos. 4,578,334 and 4,719,163, and some reusable multiactive electrophotographic elements which are designed to be sensitive to infrared radiation are described in U.S. Pat. Nos. 4,666,802 and 4,701,396.

Many known reusable multiactive electrophotographic elements sensitive to visible or infrared radiation also employ triarylamine charge-transport materials in their CTL. In those elements the triarylamine is dispersed or dissolved in a film-forming polymeric binder that forms the CTL. Such elements are described, for example, in the four U.S. patents noted above. Those patents teach many polymers as having utility as film-forming binders for CTL's. Among the many polymers so described, are polycarbonates, such as poly[2,2-bis(4-hydroxyphenyl)propane carbonate] (commonly referred to as bisphenol A polycarbonate), and polyesters. Elements containing such components fairly adequately perform their intended functions, and, in the case of the elements described in the four U.S. patents noted above, have some very important advantages over other known elements. However, it has been recognized (e.g., in U.S. Pat. Nos. 4,840,860 and 4,840,861) that there are some significant drawbacks associated with such elements.

For example, if the CTL comprises a triarylamine in a bisphenol A polycarbonate film, a significant problem may arise. The problem can occur when the CTL has been adventitiously exposed to ultraviolet radiation (i.e., radiation of a wavelength less than about 400 nanometers, which, for example, forms a significant portion of the radiation emitted by typical fluorescent room lighting). This can occur, for example, when the electrophotographic element is incorporated in a copier apparatus and is exposed to typical room illumination during maintenance or repair of the copier's internal components. The problem, which has been referred to as a UV-fogging problem, is manifested as a buildup of residual potential within the electrophotographic element over time as the element is exercised through its normal cycles of electrophotographic operation after having been adventitiously exposed to ultraviolet radiation.

For example, in normal cycles of operation such an element might be initially uniformly charged to a potential of about −500 volts, and it might be intended that the element should then discharge, in areas of maximum exposure to normal imagewise actinic visible or infrared exposing radiation, to a potential of about −100 volts, in order to form the intended electrostatic latent image. However, if the electrophotographic element has been adventitiously exposed to ultraviolet radiation, there will be a buildup of residual potential that will not be erased by normal methods of erasing residual charge during normal electrophotographic operation. For example, after about 500 cycles of operation, the unerasable residual potential may be as much as −200 to −300 volts, and the element will no longer be capable of being discharged to the desired −100 volts. This results in a latent image being formed during normal operation, that constitutes an inaccurate record of the image intended to be represented. In effect, the element has become no longer reusable, after only 500 cycles of operation.

While the mechanism of this UV-fogging problem is not presently understood, U.S. Pat. Nos. 4,840,860 and 4,840,861 theorize that the problem may be caused by a chemical change in the triarylamine charge-transport material, induced by absorption of ultraviolet radiation. This is evidenced by an observed color change in the CTL after exposure to ultraviolet radiation. It would be desirable to be able to avoid or minimize this UV-fogging problem.

On the other hand, U.S. Pat. Nos. 4,840,860 and 4,840,861 have recognized that, if the electrophotographic element comprises a CTL, wherein the triarylamine is contained in a binder film of one of certain polyesters, the UV-fogging problem does not arise. Those patents theorize that this may be because the polyester absorbs more ultraviolet radiation than does a bisphenol A polycarbonate, and thus prevents some of the ultraviolet radiation from being absorbed by the triarylamine in amounts significant enough to cause the chemical change that leads to the UV-fogging problem, and/or the polyester or some complex of the polyester with the triarylamine may otherwise quench or prevent the UV-induced chemical change from occurring.

Unfortunately, such elements having a polyester as their CTL binder exhibit another drawback recognized in U.S. Pat. Nos. 4,840,860 and 4,840,861; namely, they have significantly lower sensitivity to actinic visible or infrared radiation (sometimes referred to as lower speed) than do elements that utilize bisphenol A polycarbonate as their CTL binder. For example, in some cases the exposure to actinic radiation necessary for discharging the initial uniform electrostatic potential from −500 to −100 volts (sometimes referred to as the 100-volt speed), is about 75 percent more when a polyester is the CTL binder, compared with when bisphenol A polycarbonate is the CTL binder. This is a very significant difference in terms of high speed copiers; i.e., the copier using polycarbonate as the CTL binder can make more than 5 exposures in the same time it takes the copier with the polyester CTL binder to make 3 exposures. It would, of course, be desirable to retain this speed advantage of the polycarbonate.

It thus became evident that there was a need for a reusable visible and/or infrared-sensitive electrophotographic element that avoids or minimizes the UV-fogging problem of elements utilizing a polycarbonate CTL binder, while at the same time avoiding or minimizing the speed loss inherent in elements utilizing certain polyester CTL binders.

The inventions described in U.S. Pat. Nos. 4,840,860 and 4,840,861 meet this need by providing electrophotographic elements wherein the CTL comprises binders that are mixtures of certain polycarbonates with certain polyesters. It was found that such mixtures synergistically provide most of the UV-fogging avoidance of certain polyesters while retaining most of the speed advantage of certain polycarbonates.

While those inventions provide great benefit, there are other drawbacks associated with them. Namely, the need to employ a mixture of two binder polymers in the same layer, rather than just a single binder polymer, requires that one be concerned with the compatibility of the polymers with each other and with charge-transport agents and any other materials desired to be included in a CTL. Any incompatabilities between such materials can result in phase separations during preparation or use of the electrophotographic element. Such phase separations can cause poorer or nonuniform electrical performance in the element and can cause undesirable scatter or absorption of actinic radiation during imagewise exposure, resulting in poorer image accuracy and resolution. The risk of this occurring is inherently greater when two polymers are employed instead of one.

Therefore, a need still existed for a binder polymer for a triarylamine-containing CTL, which would avoid the UV-fogging problem while enabling the electrophotographic element to exhibit better electrophotographic speed than is afforded by other polymers known to be useful for UV-fogging avoidance, and which would accomplish this without a need to be combined in a mixture with other polymers. The present invention satisfies this need.

SUMMARY OF THE INVENTION

It has been unexpectedly found that the UV-fogging problem associated with polycarbonate CTL binder canbe avoided if a certain polyester is employed as the CTL binder. It has also been unexpectedly found that such polyester CTL binder enables an electrophotographic element to exhibit better electrophotographic speed than do other polymeric CTL binders that are known to avoid UV-fogging, even if it is not combined in a mixture with other polymeric binders.

Thus, the invention provides an electrophotographic element comprising: an electrically conductive support; a charge-generation layer sensitive to visible or infrared radiation; and a charge-transport layer containing a triarylamine charge-transport material. The element additionally contains the improvement wherein the charge-transport layer comprises a polyester containing recurring units having the structure

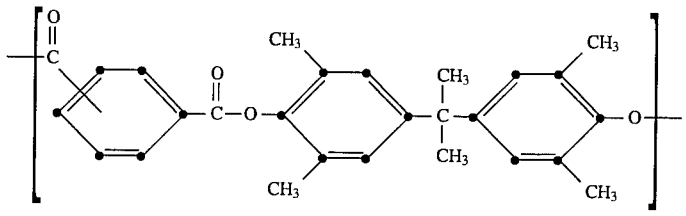

(I)

DESCRIPTION OF PREFERRED EMBODIMENTS

As previously defined, the invention pertains to any reusable multiactive electrophotographic element designed to be sensitive to visible and/or infrared radiation and containing any triarylamine charge-transport material in a polymeric CTL. Elements of that type and their preparation and use are well known in the art of electrophotography. For detailed description of such elements and their preparation and use, see, for example, U.S. Pat. Nos. 3,041,166; 3,165,405; 3,394,001; 3,679,405; 3,725,058; 4,175,960; 4,284,699; 4,578,334; 4,666,802; 4,701,396; and 4,719,163, the disclosures of which are hereby incorporated herein by reference. The only essential difference between such wellLknown elements and elements of the present invention is in the present use of a particular polyester binder in the CTL.

Although the invention is applicable when any triarylamine serves as a charge-transport material in the CTL, in a particularly preferred embodiment of the invention, the CTL contains the charge-transport material, 1,1-bis[4-(di-4-tolylamino)phenyl]-3-phenylpropane.

Of course, multiactive electrophotographic elements of the invention can contain any of the optional additional layers and components known to be useful in reusable multiactive electrophotographic elements in general, such as, e.g., subbing layers, overcoat layers, barrier layers, screening layers, additional binders, leveling agents, surfactants, plasticizers, sensitizers, and release agents.

Structure (I), illustrated above to describe recurring units contained in the polymer employed in the charge-transport layer of an element in accordance with the invention, is intended to encompass the following alternative isomeric Structures (I-A) and (I-B):

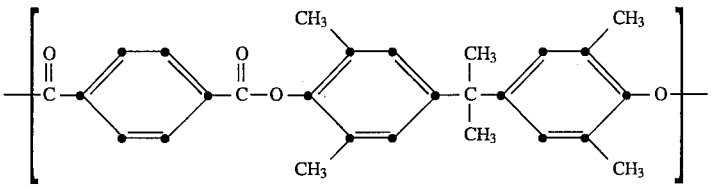

(I-A)

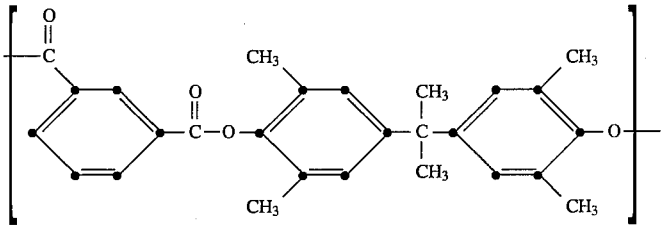

(I-B)

The polymer in the charge-transport layer of an element of the invention can contain recurring units having Structure (I-A), recurring units having Structure (I-B), or recurring units having Structure (I-A) and recurring units having Structure (I-B). All three alternatives serve the purposes of the invention well. In a preferred embodiment of the invention the polymer contains recurring units having Structure (I-A).

The polyesters having recurring units of structure (I) employed in elements of this invention can be prepared by methods generally known to be useful for polyester syntheses, e.g., by condensation of appropriate diacids (or their esters or salts) with appropriate diols. For example, appropriate diacid salts are terephthaloyl chloride and isophthaloyl chloride, which are readily commercially available, e.g., from the Eastman Kodak Co., U.S.A. An appropriate diol is tetramethylbisphenol A, which can be prepared by condensation of 2,6-dimethylphenol with acetone. Further details of preparations of the diol and an appropriate polyester are presented in Preparations 1 and 2, below. Polyesters having recurring units of Structure (I), that are useful in accordance with the invention, have weight average molecular weights within the range of from 10,000 to 200,000.

The following preparations and example are presented to further illustrate a preferred electrophotographic element of the invention and to compare it's properties and performance to those of elements outside the scope of the invention.

A polyester containing recurring units having Structure (I) was synthesized as described in Preparations 1 and 2, below.

Preparation 1: Tetramethylbisphenol A

In a 1-liter 3-necked round-bottom flask equipped with a condenser, stirrer and HCl gas inlet tube, was placed 244 g (2.0 mol) of 2,6-dimethylphenol and 116 g (2.0 mol) of reagent grade acetone. HCl gas was then bubbled into the reaction mixture for approximately 5 hours (i.e., until the mixture was saturated with HCl). The reaction mixture was stirred at room temperature for 24 hours, and the solids were filtered and washed twice with 1 liter of hexanes, followed by 1 liter of distilled water, then again with hexanes. The crude product was recrystallized from 1.5 liters of 80% aqueous methanol, collected, and dried in a vacuum oven at 50° C. for 24 hours to give 185 g (65%) of the desired product as white crystals.

Melting point=164° C.

Elemental Analysis: calculated for $C_{19}H_{24}O_2$:
80.2% C, 8.5% H; found: 80.2% C, 8.5% H.

Preparation 2: Poly(tetramethylbisphenol A terephthalate). Structure (I-A)

To a stirred mixture of tetramethylbisphenol A (28.44 g, 0.10 mol) and triethylamine (22.3 g, 0.22 mol) in methylene chloride (100 ml) at 10° C. was added a solution of tezephthaloyl chloride (20.3 g, 0.10 mol) in methylene chloride (70 ml). After addition, the temperature was allowed to rise to room temperature, and the solution was stirred under nitrogen for 4 hours, during which triethylamine hydrochloride precipitated in a gelatinous form and the solution became viscous. The solution was then filtered and washed with dilute hydrochloric acid, 2% (100 ml) followed by water (3×200 ml). The solution was then poured into methanol with vigorous stirring, and a white fibrous polymer, the desired product, precipitated. The isolated polymer was dried in a vacuum oven at 40° C. for 24 hours to give a 97% yield (40 g).

Weight average molecular weight = 48,100.

Number average molecular weight = 20,800.

(Molecular weights were determined by gel permeation chromatography based on polystyrene equivalents.)

Glass transition temperature (by differential scanning calorimetry)=234° C.

EXAMPLE 1

An electrophotographic element of the invention was prepared as follows.

A conductive support was utilized, comprising a 178 micrometer thickness of poly(ethylene terephthalate) film having vacuum-deposited thereon a thin conductive layer of nickel.

An adhesive layer was coated onto the nickel surface of the conductive support from a solution of 4.8 g of poly-(acrylonitrile-co-vinylidene chloride) (17:83 molar ratio) in 1.2 kg of methyl ethyl ketone solvent and dried. Coverage after drying was 21.5 mg/m$^2$.

A charge-generation layer was vacuum-deposited onto the adhesive layer by sublimation of the charge-generation material, N,N'-bis(2-phenethyl)perylene-3,4:9,10-bis(dicarboximide), from a resistance-heated tantalum crucible at a temperature of about 181° C., a pressure of $1.14\times10^{-3}$ Pa, and a crucible to substrate distance of 25 cm, to achieve a coverage of 380 mg/m$^2$.

A charge-transport layer was prepared in darkness by dispersing 0.438g of the charge-transport material, 4,4'-bis(diethylamino)tetraphenylmethane, and 70.0 g of the triarylamine charge-transport material, 1,1-bis[4-(di-4-tolylamino)phenyl]-3-phenylpropane, in 1.171 kg of the solvent, dichloromethane, and then adding to the solvent: 100.8 g of Structure (I-A) polyester prepared in accordance with Preparations 1 and 2, above; 4.2 g of another polymer, poly(ethylene-co-neopentylene terephthalate) (55:45 molar ratio) (to serve as an adhesion promoter); and 0.33 g of a siloxane surfactant sold under the trademark, DC 510, by Dow Corning, U.S.A. The mixture was stirred for 24 hours to dissolve the polymers in the solvent and was then coated onto the charge-generation layer and dried to form the charge-transport layer at a dry coverage of 23.7 g/m$^2$ (a thickness of about 22 micrometers).

The electrophotographic element was then subjected to 50 cycles of operation comprising initially uniformly charging the element to −500 volts, exposing the element through the CTL to visible actinic radiation (radiation having a peak intensity at a wavelength of 640 nm, to which the charge-generation material in the CGL is sensitive in order to generate electron/hole pairs) up to an amount just sufficient to discharge the element to −100 volts (to simulate imaging exposure), and then exposing the element to excess visible radiation in order to attempt to erase the remaining charge. The amount of imaging exposure to visible radiation necessary to reduce the charge from −500 to −100 volts was only 2.5 ergs/cm$^2$ during the initial cycle of operation. After 50 cycles of operation, the electrophotographic element was exposed to typical fluorescent room lighting (having typically significant amounts of ultraviolet output) for 15 minutes at an illuminance of 2152 lux, to simulate adventitious exposure to ultraviolet radiation. The element was then subjected to another 50 cycles of operation, and it was found that the residual potential remaining in the element after attempted erasure by excess radiation (i.e., after the last step of the last cycle) was only −33 volts.

This illustrates that the element exhibited very high speed and little UV-fogging.

Similar results are achieved when the triarylamine charge-transport material in the CTL is tri-p-tolylamine or 1,1-bis[4-(di-p-tolylamino)phenyl]cyclohexane or when the Structure (I) polymer contains recurring units having Structure (I-B) or contains recurring units having Structure (I-A) and recurring units having Structure (I-B).

For purposes of comparison, control elements outside the scope of the invention were also prepared and tested in order to further illustrate the beneficial effects of the invention. The control elements were prepared and tested exactly as the inventive element described in Example 1, except that the Structure (I) polyester in the CTL was replaced with a different polymer (in the same amount) for each control element.

In a control element referred to as "Control A", bisphenol A polycarbonate (sold under the trademark, Makrolon 5705, by Mobay Chemical Co., U.S.A.) was employed in the CTL instead of the Structure (I) polyester.

In a control element referred to as "Control B", a polycarbonate comprising recurring units having the structure

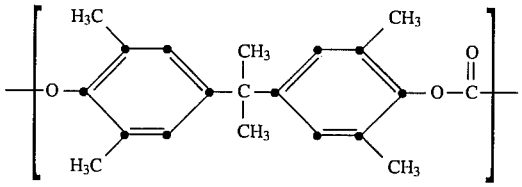

was employed in the CTL instead of the Structure (I) polyester.

In a control element referred to as "Control C", polystyrene was employed in the CTL instead of the Structure (I) polyester.

TABLE I

| Example | residual potential[1] (volts) | necessary exposure[2] (ergs/cm$^2$) |
|---|---|---|
| 1 | −33 | 2.5 |
| Control A | −132 | 2.2 |
| Control B | −226 | 2.0 |
| Control C | −98 | 3.9 |

[1]residual potential, after: 50 cycles of operation, followed by exposure to ultraviolet radiation, followed by 50 more cycles of operation

[2]amount of exposure to actinic visible radiation necessary to discharge element from −500 to −100 volts during initial cycle of operation The results in Table I illustrate that in an element of the invention (Example 1) the UV-fogging problem was greatly minimized, so that the element remains reusable after UV exposure (residual potential remains less than −100 volts) in operations involving attempted discharging of the element from −500 volts to −100 volts. This is in contrast to the control elements, which exhibited unacceptable residual potential (Control A and B) or borderline residual potential (Control C).

Also, the Example 1 element of the invention exhibited very high sensitivity (the necessary exposure to actinic radiation being only about 14% greater than that required for the Control A element, which employs bisphenol A polycarbonate in its CTL). Note further that the Control C element, which was borderline for residual potential, exhibited much lower sensitivity (the necessary exposure to actinic radiation being 77% greater than that required for the Control A element).

It should also be noted that the high sensitivity of an element of the invention containing the Structure (I) polyester was unexpected, given that other polyesters known to be useful to avoid UV-fogging, when employed as a complete replacement for bisphenol A polycarbonate in a triarylamine-containing CTL, cause electrophotographic elements to exhibit much lower sensitivity. Evidence of this can be found, for example, in Tables I of U.S. Pat. Nos. 4,840,860 and 4,840,861. Note that in U.S. Pat. No. 4,840,860, the Example D element, which employed a polyester, formed from 4,4'-(2-norbornylidene) diphenol and terephthalic and azelaic acids, in its CTL, required about 56% more exposure than the Example A element, which employed bisphenol A polycarbonate in its CTL. Note that in U.S. Pat. No. 4,840,861, the Example E element, which employed a polyester, formed from 2,2-bis(4-hydroxyphenyl)propane and terephthalic and isophthalic acids, in its CTL, required about 76% more exposure than the Example A element, which employed bisphenol A polycarbonate in its CTL.

The invention has been described in detail with particular reference to certain preferred embodiments thereof, but it should be appreciated that variations and modifications can be effected within the spirit and scope of the invention.

What is claimed is:

1. In an electrophotographic element comprising:

an electrically conductive support;

a charge-generation layer sensitive to visible or infrared radiation; and a charge-transport layer containing a triarylamine charge-transport material, the improvement wherein the charge-transport layer comprises a polyester containing recurring units having the structure

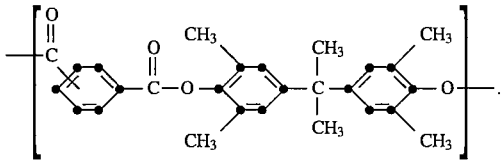

2. The electrophotographic element of claim 1, wherein the triarylamine charge-transport material comprises 1,1-bis [4-(di-4-tolylamino)phenyl]-3-phenylpropane.

3. The electrophotographic element of claim 1, wherein the polyester contains recurring units having the structure

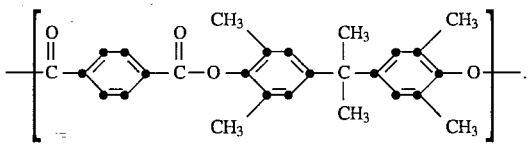

* * * * *